Nov. 27, 1951     E. R. SMITH     2,576,704
MEANS FOR ENGAGING AND DRIVING ROTATED WORKPIECES
Filed March 19, 1949     2 SHEETS—SHEET 1
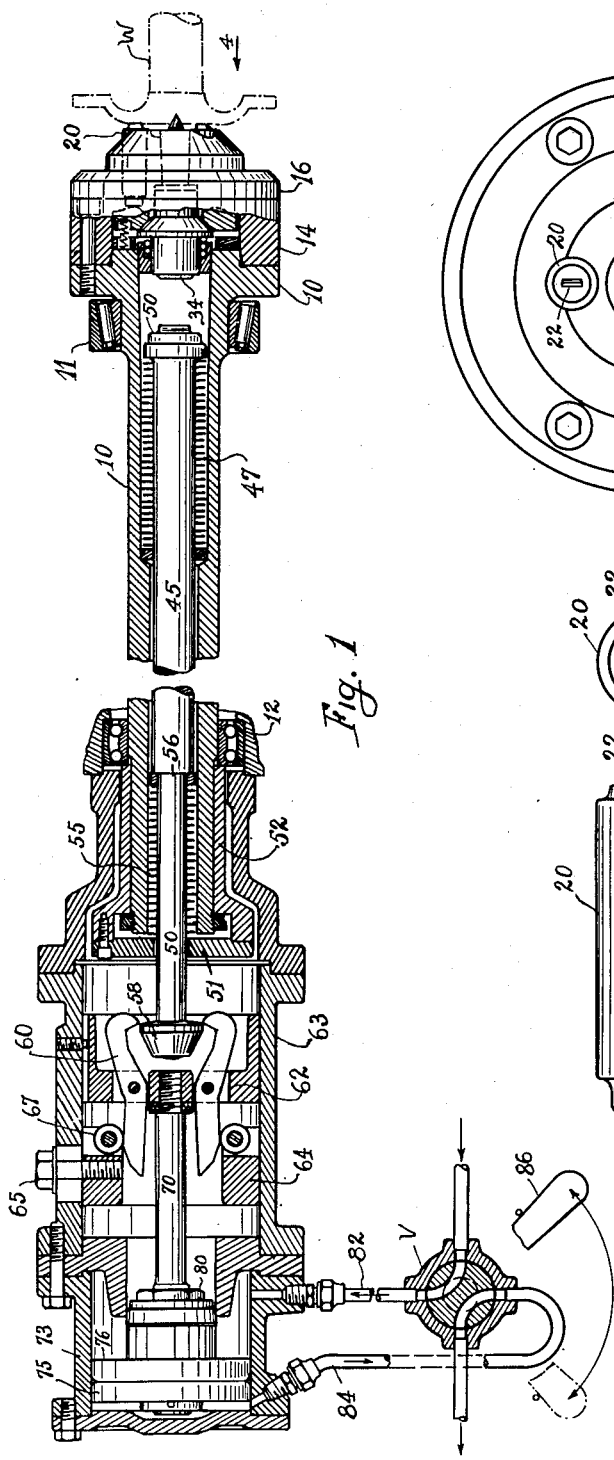
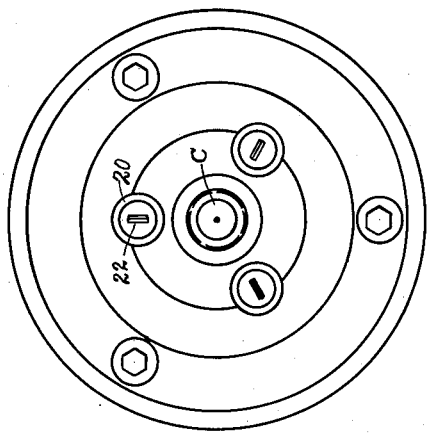
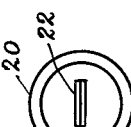
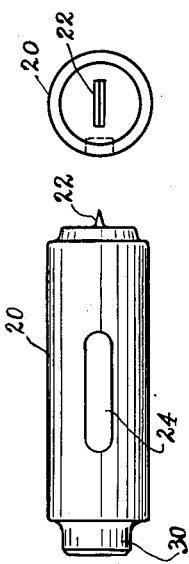
INVENTOR.
Edwin R. Smith
BY
Chas. T. Hawley
Att'y.

Nov. 27, 1951     E. R. SMITH     2,576,704
MEANS FOR ENGAGING AND DRIVING ROTATED WORKPIECES
Filed March 19, 1949     2 SHEETS—SHEET 2
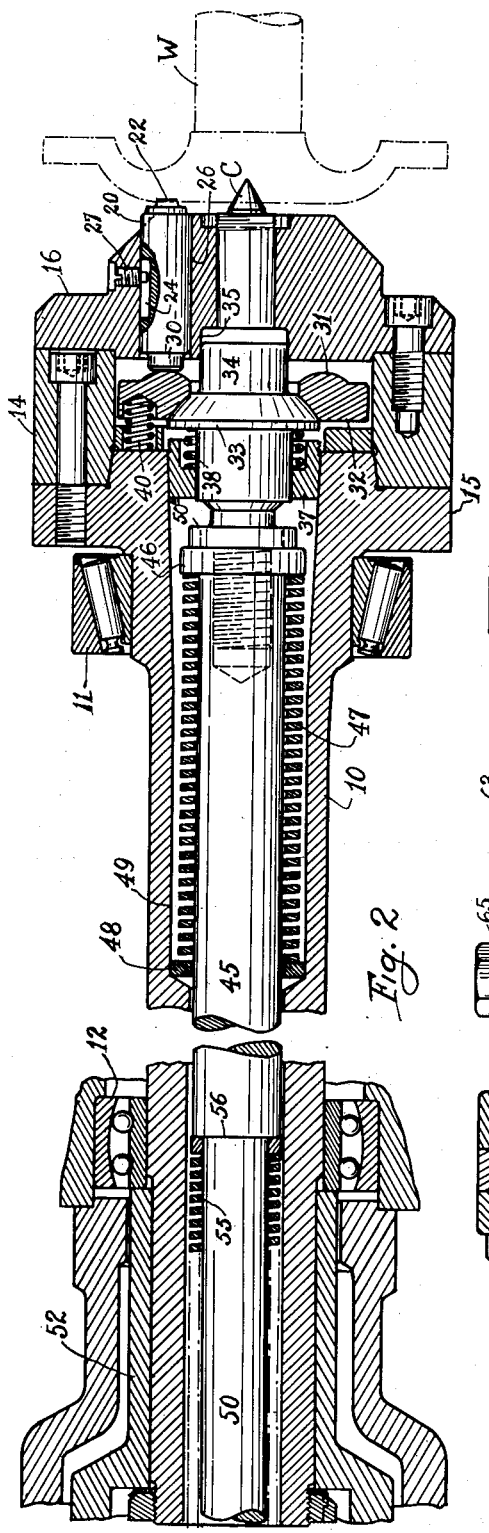
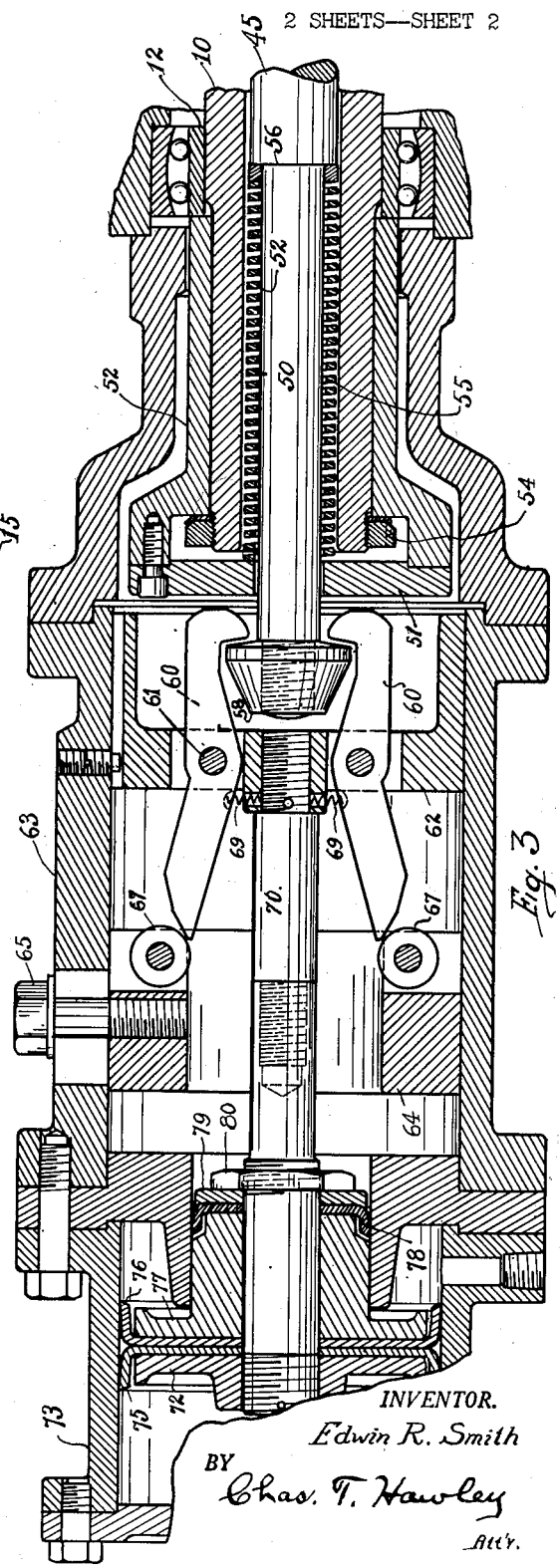
INVENTOR.
Edwin R. Smith
BY Chas. T. Hawley
Att'y.

Patented Nov. 27, 1951

2,576,704

UNITED STATES PATENT OFFICE 2,576,704

MEANS FOR ENGAGING AND DRIVING ROTATED WORKPIECES

Edwin R. Smith, Seneca Falls, N. Y., assignor to Seneca Falls Machine Company, Seneca Falls, N. Y., a corporation of Massachusetts Application March 19, 1949, Serial No. 82,423

4 Claims. (Cl. 142—53)

This invention relates to means for engaging and driving work pieces which are rotatably supported at the driving end on a live center.

It is customary to provide a dog and face plate for driving such work pieces, but considerable time is wasted in applying and removing the dogs, and it is also impossible to operate over the entire peripheral surface of such a work piece without shifting the dog and reversing the work.

It is the general object of my invention to provide an improved and simplified means for effecting driving engagement with an end surface of a rotated work piece, while leaving the peripheral surface thereof entirely unobstructed.

To the accomplishment of this general object, the invention contemplates the provision of a plurality of driving members engageable with an end surface of the work, together with effective means to force said members into said end surface and to retain said members firmly in driving engagement therewith.

My invention further relates to arrangements and combinations of parts which will be hereinafter described and more particularly pointed out in the appended claims.

A preferred form of the invention is shown in the drawings, in which

Fig. 1 is a longitudinal sectional elevation of a work-driving spindle embodying my invention;

Fig. 2 is an enlarged sectional elevation corresponding to the right-hand end portion of Fig. 1, but with the parts in driving position;

Fig. 3 is an enlarged sectional elevation corresponding to the left-hand end portion of Fig. 1 but with certain parts returned to engaging position;

Fig. 4 is an end view of the spindle, looking in the direction of the arrow 4 in Fig. 1;

Fig. 5 is a side elevation of one of the driving members; and

Fig. 6 is an end view thereof.

Referring to Figs. 1 and 2, I have shown a work spindle 10 which may be mounted in any suitable bearings 11 and 12. A ring 14 (Fig. 2) is mounted on the flanged outer end 15 of the spindle 10, and a driving plate 16 is clamped to the ring 14 and is accurately centered thereby.

A live center C is mounted in the driving plate 16 and receives a center hold in the end of the work piece W. The other end of the work piece is to be positioned and supported by a tail center or in any other usual manner.

The driving plate 16 supports a plurality of cylindrical driving members 20 (Figs. 5 and 6) which are preferably of hardened steel and which are each provided with a hardened point or driving projection 22 and with a short longitudinal keyway 24. These members 20 may desirably have radially-aligned chisel points and are freely slidable in passages 26 in the plate 16, and they may be held from rotation in the passages 26 by set-screws 27 extending into the keyways 24.

At their inner ends, the members 20 have reduced projecting portions 30 which engage an annular curved surface 31 on a swivel collar 32. This collar has a swivel bearing on a segmental flange 33 formed on a short plunger 34, the outer end of which is slidable in a recess 35 in the driving plate 16. The inner end of the plunger 34 is slidable in a bearing sleeve 37 secured in the outer end of the work spindle 10.

Suitable pressure means holds the points 22 of the members 20 against the work. Such pressure means may comprise a relatively heavy spring 38 interposed between the end of the bearing sleeve 37 and the flange 33 on the plunger 34. A plurality of relatively light springs 40 may also be interposed between the outer end of the work spindle 10 and the swivel collar 32. The springs 38 and 40 act to maintain constant pressure on the driving members 20 and the driving points 22.

A hammer rod 45 is mounted to slide freely axially in the spindle 10 when pressure is applied thereto. In the construction shown the rod 45 is provided with an end flange or collar 46 which is engaged by a heavy spring 47. The inner end of the spring is seated against a ring 48 seated in the bottom of a recess 49 in the spindle 10.

A hardened striker 50a is threaded into the outer end of the rod 45 and is positioned to engage the inner end of the plunger 34 which supports the swivel ring 32.

If the hammer rod 45 is withdrawn to the left, as shown in Fig. 1, and is then released, the rod will advance abruptly to the position shown in Fig. 2, and a sharp blow will be transmitted from the hammer rod 45 through the striker 50, plunger 34, and swivel collar 32 to the inner ends of the members 20. The driving points 22 thereof will thus be firmly driven against the end of the work piece W.

Driving engagement of the work piece is thus effectively achieved. The hammer operation may be repeated to effect increased penetration.

The hammer rod 45 may be withdrawn manually but the mechanism herein shown is particularly designed for automatic fluid-pressure operation.

For this purpose, the rod 45 is extended to the left as shown in Fig. 3, and its reduced end portion 50 is loosely centered in a plate 51 mounted on a sleeve 52 which is clamped to the inner end of the spindle 10 by a nut 54 (Fig. 3). A second hammer spring 55 may be mounted on the reduced end portion 50 of the rod 45 and is confined between a shoulder 56 on said rod and the end bearing plate 51. The action of the springs 47 and 55 is cumulative.

A conical nut or collar 58 is mounted on the extreme inner end of the extension 50 of the rod 45 and is positioned for engagement by latches 60 which are pivoted at 61 in a member 62 slidable in a fixed cylindrical casing 63. An annular member 64 is also slidable in the casing 63 and may be secured in adjusted axial position by clamping screws 65. The member 64 supports a plurality of rolls 67, each positioned for engagement by one of the latches 60. Springs 69 tend to move the latches 60 to the position shown in Fig. 3.

A piston rod 70 is threaded into the sliding member 62 and its left-hand end is connected to a piston 72 slidable in a fixed cylinder 73. The piston 72 is preferably provided with oppositely disposed cup washers 75 and 76, a clamping collar 77, an additional cup washer 78, a washer 79, and a nut 80.

When fluid pressure is supplied at the right-hand side of the cylinder 73, as through the pipe 82 (Fig. 1), the piston 72 and connected parts will be moved to the left, and when pressure is applied to the left-hand side of the piston through the pipe 84 (Fig. 1), the same parts will be moved to the right.

A four-way control valve V is preferably provided, which may be moved manually by a handle 86 to connect either side of the cylinder 73 to the pressure supply and the other side to the exhaust.

Having described the details of construction, the method of operation is as follows:

The work piece is mounted on the live center C and is advanced by the tail center (not shown) to engage the driving points 22 and to force the driving members 20 slightly to the left in the drawings, thereby compressing the spring 38.

The handle 86 is then moved to shift the valve V to supply pressure to the right-hand end of the cylinder 73, thus moving the latches 60 to the left and withdrawing the hammer rod 45 against the combined resistance of the springs 47 and 55.

At a certain point in the withdrawing movement of the latches 60, the tails of the latches will be engaged and depressed by the rolls 67, and the hammer rod 45 will be released to deliver a strong hammer blow on the driving members 20. The driving points 22 are thus forced firmly into the end of the work piece W, and such engagement is maintained by the relatively heavy springs 47 and 55. The force of the blow may be regulated by shifting the roll-supporting member 64 toward or away from the latch support 62 to vary the point of release of the latches 60.

After the blow has been struck, the latches may be returned to engaging position by reversing the valve V, and by again shifting the valve one or more additional blows may be delivered.

It is found in actual practice that a plurality of driving points, as 22, which are thus driven firmly against the end of the work piece and which are continuously maintained in contact therewith, provide sufficient and effective driving engagement for any ordinary turning or grinding operations.

Having thus described my invention and the advantages thereof, I do not wish to be limited to the details herein disclosed, otherwise than as set forth in the claims, but what I claim is:

1. Means for engaging and driving a rotated work piece mounted on head and tail centers, which means comprises a work spindle supporting said live center and having an end member fixed thereon, a plurality of separate and circumferentially-spaced driving members mounted in said end member and separately slidable in said member axially of said spindle and each having a separate work-indenting end portion, a transmitting member simultaneously engaging all of said slidable driving members, a hammer rod slidable in said spindle, pressure means effective when released to advance said rod to strike a strong blow through said transmitting member against each of said separately slidable driving members, means to withdraw said rod, and means to thereafter release said rod for forward striking movement produced by said pressure means, and said pressure means being thereafter effective to hold the work-engaging end portions of said separately slidable driving members against the work and in driving engagement therewith.

2. The combination in work-engaging and driving means as set forth in claim 1, in which the withdrawal means includes latches engaging an enlarged end of said hammer rod, and rolls engaging and releasing said latches at a predetermined point in the withdrawing travel of said latches.

3. The combination in work-engaging and driving means as set forth in claim 1, in which the transmitting member has a swivel support by which the blows on all of the driving members are equalized.

4. Means for engaging and driving a rotated work-piece mounted on head and tail centers which comprises a work spindle supporting said live center and having an end member fixed thereon, a plurality of separate and circumferentially-spaced driving members mounted in said end member and separately slidable axially of said spindle and each having a separate work-indenting end portion, a transmitting member simultaneously engaging all of said separately slidable driving members, a hammer rod slidable in said spindle, coaxial tandem springs mounted on said hammer rod and cumulatively effective, when released, to advance said rod to strike a strong blow through said transmitting member against said separately slidable driving members, means to withdraw said rod and compress said springs, and means to thereafter release said rod at a predetermined point in the withdrawal movement thereof for return forward striking movement thereof under the combined pressure of said tandem springs, and said springs being thereafter effective to hold the end portions of said separately slidable driving members against the work and in driving engagement therewith.

EDWIN R. SMITH.

REFERENCES CITED

The following references are of record in the file of this patent:

UNITED STATES PATENTS

| Number | Name | Date |
| --- | --- | --- |
| 913,677 | Ainsworth | Mar. 2, 1909 |
| 1,054,042 | Shaw | Feb. 25, 1913 |
| 1,592,610 | Meszaros | July 13, 1926 |
| 1,704,852 | Bath | Mar. 12, 1929 |
| 2,049,191 | Bouget et al. | July 28, 1936 |
| 2,455,270 | Ravella | Nov. 30, 1948 |